Figure 1A:
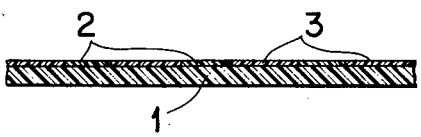

United States Patent [19]

Minami et al.

[11] 4,117,181

[45] Sep. 26, 1978

[54] DECORATIVE LAMINATED STRUCTURES AND METHOD OF MAKING THE SAME

[75] Inventors: Kazuto Minami, Tokyo; Norihiko Tsukui, Higashikurume; Tsunehiko Imamoto, Funabashi, all of Japan

[73] Assignee: Dai Nippon Printing Co., Ltd., Tokyo, Japan

[21] Appl. No.: 593,517

[22] Filed: Jul. 7, 1975

Related U.S. Application Data

[63] Continuation of Ser. No. 352,423, Apr. 19, 1973, abandoned.

[30] Foreign Application Priority Data

Apr. 20, 1972 [JP] Japan .................... 47-39141
Apr. 20, 1972 [JP] Japan .................... 47-52168

[51] Int. Cl.$^2$ .................... B32B 3/24; B32B 3/30; B32B 31/26
[52] U.S. Cl. .................... 428/138; 156/58; 156/59; 156/85; 156/272; 156/277; 427/257; 427/271; 427/280; 427/287; 427/288; 427/384; 427/390 R; 427/393; 428/151; 428/152; 428/195; 428/913
[58] Field of Search .................... 427/287, 288, 372, 388, 427/390 R, 391, 393–397, 257, 146, 148, 243, 245, 274, 271, 280, 276; 156/84, 85, 58, 59, 272, 277; 428/151, 152, 138, 172, 195, 199, 207, 913

[56] References Cited

U.S. PATENT DOCUMENTS

| 2,988,800 | 6/1961 | White | 28/72 |
| 3,575,755 | 4/1971 | Cutler et al. | 156/85 |
| 3,745,059 | 7/1973 | Kubo et al. | 156/289 |
| 3,856,598 | 12/1974 | Gregorion et al. | 428/96 |
| 3,860,469 | 1/1975 | Gregorion et al. | 156/83 |

FOREIGN PATENT DOCUMENTS 2,063,961  7/1972  Fed. Rep. of Germany .............. 156/85

*Primary Examiner*—Stanley S. Silverman
*Attorney, Agent, or Firm*—Armstrong, Nikaido, Marmelstein & Kubovcik

[57] ABSTRACT

This invention provides a decorative laminated structure having on the surface a pattern composed of concaves, at least one of said concaves having an opening at its bottom portion formed by local heat shrinkage of a layer of a heat-shrinkable resin sheet employed. Such decorative laminated structure is prepared by a method comprising forming a composite layer structure including a base, a heat-shrinkable resin sheet, a picture layer containing heat insensitive picture areas and another picture layer having heat sensitive picture areas, said heat sensitive picture areas being contiguous and closely adherent to said heat-shrinkable resin sheet; and irradiating the composite layer structure with a heat ray in an amount sufficient for making an opening in the heat-shrinkable resin sheet to thereby cause the heat-shrinkable resin sheet to shrink locally and form concaves, at least one of said concaves having an opening at its bottom portion at portions corresponding to the heat sensitive picture areas. Such structure can also be prepared when a composite layer structure including a picture layer containing heat sensitive picture areas, said heat sensitive picture areas being contiguous and closely adherent to said heat-shrinkable resin sheet, is at first prepared in the same manner as above and irradiated with a heat ray and a picture layer having heat insensitive picture areas is applied on a heat-shrinkable resin sheet of the resulting composite layer structure. Such decorative laminated structure can be improved in thermal characteristics when it is subjected to a heat fixation treatment at elevated temperatures while fixing its peripheral ends. A decorative laminated structure of this invention exhibits excellent decorative effects, and can be used effectively as a decorating material in various fields.

38 Claims, 23 Drawing Figures

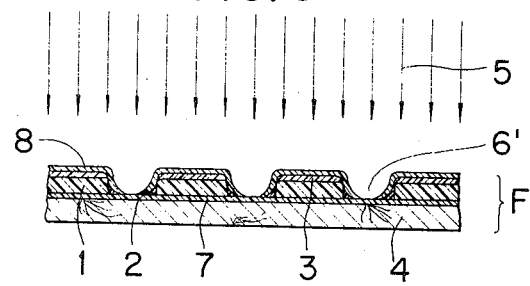
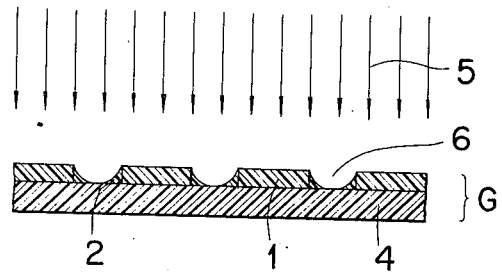
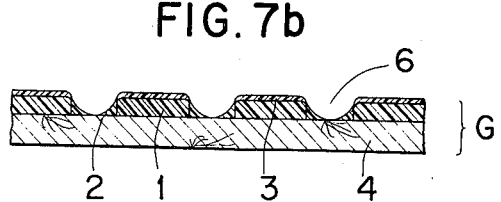

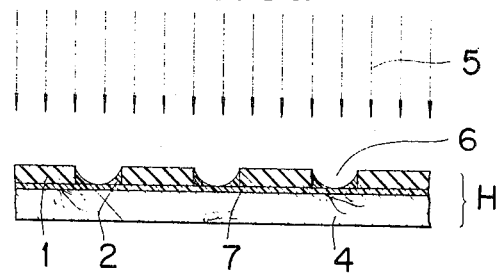
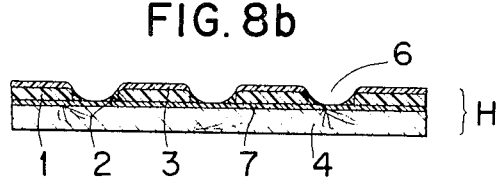
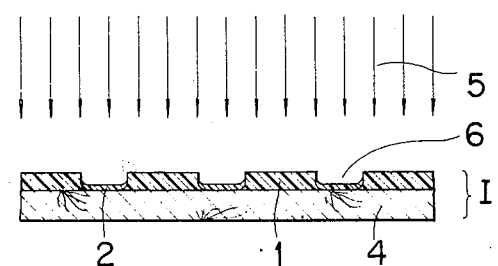
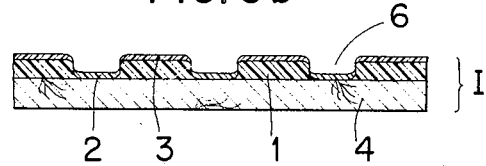

DECORATIVE LAMINATED STRUCTURES AND METHOD OF MAKING THE SAME

This is a continuation, of application Ser. No. 352,423 filed Apr. 19, 1973 now abandoned.

This invention relates to a decorative laminated structure and a method of making the same. More particularly, the invention concerns a decorative laminated structure having on its surface a beautiful pattern composed of concaves, at least one of said concaves having an opening at its bottom portion and being full of reality and three dimensional imagination, and a method of making the same.

There have heretofore been proposed various kinds of decorative laminated structures for uses not only as a material of a ceiling, floor, wall, etc. of a building, car, ship and the like but also as a material of furniture, fittings, tables, musical instruments, cabinets and the like. Recently, however, many consumers are not satisfied with conventional decorative laminated structures having only a flat and smooth, decorated surface. There has been an increasing demand for a novel, aesthetic laminated structure which has on its surface a sophisticated and complicated pattern or design with a three dimensional effect. As the laminated structures provided on its surface with a pattern of a three dimensional effect, there have been known those having a surface with a pattern composed of various shapes of concaves and convexes.

As examples of the laminated structures having such pattern composed of concaves and convexes, there have been structures comprising a suitable base provided thereon with a pattern imitating a natural pattern of grains of wood or stone, a pattern of cloth or the like, and concaves formed thereon. Such concaves are usually formed on duct groove portions when the pattern of grains of wood is employed, on crack portions when the pattern of grains of stone is employed, or on woven portions when the pattern of cloth is employed. Thus, there have been provided decorative laminated structures provided with patterns full of reality as well as three dimensional imagination. In forming the concaves and convexes on the surface of the above-mentioned decorative laminated structure, such method is generally employed that a metallic mould roll or metallic mould plate having on its surface a pattern composed of concaves and convexes is pressed onto the surface of the pattern of grains of wood or stone, a pattern of cloth or the like which is formed on the base thereby to effect an embossing processing.

For practising such method, it is necessary to provide the above-mentioned kind of metallic mould roll or metallic mould plate which is expensive to manufacture due to the necessity of a high degree of processing technique, leading to a high cost of the resulting product. Moreover, it is very difficult to make fine and complicated shapes of concaves and convexes on the metallic mould roll or plate and hence, the pattern of such metallic mould roll or plate tends inevitably to be of comparatively simple concave and convex shape. Consequently, with such conventional method, it is extremely difficult to make, on the pattern surface of the laminated structures, such a pattern of fine and complicated or sophisticated shapes of concaves and convexes as is capable of imparting to the product reality and three dimensional imagination.

Furthermore, it is noted that for practising the method employing a metallic mould roll or plate, the following additional difficulties or disadvantages are encountered:

(1) When a varied pattern of concaves and convexes is desired, it is necessary to prepare an additional metallic mould roll or plate having a pattern corresponding to the varied pattern, leading to remarkably high cost.

(2) With employing the metallic mould roll or plate having a pattern of concaves and convexes, it is very difficult to effect an embossing process while coordinating the pattern of concaves and convexes of the metallic mould roll or plate with the pattern previously formed on the surface of the laminated structure. Even slight dis-coordination or disorder causes the commercial value of the product to be largely reduced.

(3) Since the embossing processing is conducted mechanically and physically by employing the mould roll or plate made of metal, the surface of the desired decorative laminated structure will frequently be damaged during the processing operation.

We have made intensive and extensive research works with a view to obtaining a decorative laminated structure having on its surface an excellent pattern or design composed of concaves, at least one of said concaves having an opening at its bottom portion while overcoming the above-mentioned difficulties and disadvantages of the prior art techniques. As a result, it has now been found that when a composite layer structure comprising a base, a heat-shrinkable resin sheet, a picture layer having heat insensitive picture areas and another picture layer having heat sensitive picture areas which is contiguous and closely adherent to said heat-shrinkable resin sheet and is co-ordinated with the picture areas of the first-mentioned picture layer is irradiated with a heat ray in an amount sufficient for making an opening in the heat-shrinkable resin sheet to thereby cause said heat-shrinkable resin to shrink locally and form concaves, at least one of said concaves having an opening at its bottom portion at portions contiguous and closely adherent to said heat sensitive picture areas, or when a composite layer structure comprising a base, a heat-shrinkable resin sheet, and a picture layer having heat sensitive picture areas which is contiguous and closely adherent to said heat-shrinkable resin sheet is irradiated with a heat ray in an amount sufficient for making an opening in the heat-shrinkable resin sheet to thereby cause said heat-shrinkable resin sheet to shrink locally and form concaves, at least one of said concaves having an opening at its bottom portion at portions contiguous and closely adherent to said heat sensitive picture areas, and a picture layer having picture areas is applied onto said composite layer structure so that the picture areas of said picture layer are co-ordinated with said concaves, at least one of said concaves having an opening at its bottom portion formed on the heat-shrinkable resin sheet, there is obtained a decorative laminated structure being excellent in decorative effects and strength and durability, which has a beautiful and three-dimensional pattern full of reality in which the concaves, at least one of said concaves having an opening at its bottom portion formed by local shrinkage of the heat-shrinkable resin sheet are well co-ordinated with the picture areas of the picture layer.

It has also been found that when the decorative laminated structure obtained by the above-mentioned procedures is further heat-treated at elevated temperatures while supporting the peripheral ends of the structure to effect the heat fixation in the heat-shrinkable resin sheet, the thermal stability, especially resistance against heat distortion, of the decorative laminated structure can be greatly improved.

This invention has been completed based on the foregoing findings.

It is therefore a primary object of this invention to provide a decorative laminated structure having a beautiful and three-dimentional pattern full of reality in which concaves, at least one of said concaves having an opening at its bottom portion and picture areas formed on the surface of the structure are well co-ordinated with each other.

Another object of this invention is to provide such decorative laminated structure as mentioned above, which is excellent in strength and durability, especially resistance against heat distortion.

A further object of this invention is to provide a method of making such decorative laminated structures which can be performed with ease without employing a mechanical embossing member such as a metallic mold roll or plate.

A still further object of this invention is to provide a method which can mass-produce such decorative laminated structures at low costs and at high manufacturing efficiency.

The foregoing and other objects, features and advantages of this invention will be apparent from the following detailed description and accompanying drawings in which FIGS. 1a to 13b are enlarged views illustrating modes of forming decorative laminated structures of this invention, which are specifically disclosed in Examples given hereinafter.

Essentially, in accordance with this invention, there is provided a decorative laminated structure having a pattern composed of concaves, at least one of said concaves having an opening at its bottom portion which comprises a composite layer structure including a base, a heat-shrinkable resin sheet, a picture layer having heat insensitive picture areas, and another picture layer having heat sensitive picture areas which is contiguous and closely adherent to said heat-shrinkable resin sheet and is co-ordinated with the picture areas of the first-mentioned picture layer, wherein concaves, at least one of said concaves having an opening at its bottom portion are formed on said heat-shrinkable resin sheet at portions corresponding to said heat sensitive picture areas and are co-ordinated with the heat insensitive picture areas of the first-mentioned picture layer.

Such decorative laminated structure can be obtained by a method comprising forming a composite layer structure including a base, a heat-shrinkable resin sheet, a picture layer having heat insensitive picture areas and another picture layer having heat sensitive picture areas which is contiguous and closely adherent to said heat shrinkable resin sheet and co-ordinated with the heat insensitive picture areas of the first-mentioned picture layer; and irradiating said composite layer structure with a heat ray in an amount sufficient for making an opening in the heat-shrinkable resin sheet to thereby cause said heat-shrinkable resin sheet to shrink locally and form concaves, at least one of said concaves having an opening at its bottom portion at portions contiguous and closely adherent to said heat sensitive picture areas. (sometimes referred to as "first method" hereinafter).

It is also possible to obtain such decorative laminated structure by a method comprising forming a composite layer structure including a base, a heat-shrinkable resin sheet and a picture layer having heat sensitive picture areas which is contiguous and closely adherent to said heat-shrinkable resin sheet, irradiating said composite layer structure with a heat ray in an amount sufficient for making an opening in the heat-shrinkable resin sheet to thereby cause the heat-shrinkable resin sheet to shrink locally and form concaves, at least one of said concaves having an opening at its bottom portion at portions contiguous and closely adherent to said heat sensitive picture areas, and applying a picture layer having picture areas onto said heat-shrinkable resin sheet of composite layer structure so that the picture areas of said picture layer are co-ordinated with said concaves, at least one of said concaves having an opening at its bottom portion formed on the heat-shrinkable resin sheet. (sometimes referred to as "second method" hereinafter).

The heat-shrinkable resin sheet to be used for forming the decorative laminated structure of this invention may be any of sheets of thermoplastic resins having a heat-shrinkable property. Examples of such heat-shrinkable resins include polyvinyl chloride type resins, polyvinylidene chloride type resins, polyolefin type resins such as polyethylene and polypropylene resins, polyester type resins, polyamide type resins, polystyrene type resins, polycarbonate type resins, polyvinyl alcohol type resins, and other synthetic thermoplastic homopolymer and copolymer resins; cellulose type resins; rubber type resins; and the like. These sheets are usually employed after they have been uniaxially or biaxially stretched by a customary stretching method. In this invention, as described above, concaves, at least one of said concaves having an opening at its bottom portion are formed under irradiation of a heat ray on the heat-shrinkable resin at portions corresponding to heat sensitive picture areas. More specifically, when the heat sensitive picture areas of the starting composite layer structure are under irradiation of a heat ray, they selectively absorb the heat energy and elevate their temperature to cause the heat-shrinkable resin sheet to shrink locally at portions contiguous and closely adherent to the heat sensitive picture areas and thus form concaves, at least one of said concaves having an opening at its bottom portion at said portions. Accordingly, the resin sheet to be used in this invention should be one that has not been subjected to a heat fixation treatment or one that, if it has been subjected to a heat fixation treatment, still retains a heat shrinkability enough to exhibit the above-mentioned local shrinkage under irradiation of a heat ray. In other words, even a thermoplastic resin sheet cannot be used in this invention, if it has sufficiently been subjected to a heat fixation treatment and has lost completely the heat shrinkability.

Moreover, as the heat-shrinkable resin, there may be employed any of thermoplastic resin sheets which are uncolored and transparent or opaque, thermoplastic resin sheets which are colored transparently or opaquely, and thermoplastic resin sheets which are colored by forming a coloring layer on the entire surface thereof, as long as it has a heat-shrinkable property.

In the heat-shrinkable resin sheet to be used in this invention, such conditions of the heat shrinkage as the heat shrinkage rate, the stretching direction, the heat shrinkage-initiating temperature, the shrinking force, the sheet thickness and the like have influences on the depth and size of the concaves, at least one of said concaves having an opening at its bottom portion formed on the heat-shrinkable resin sheet. However, none of them are critical in this invention. As described above, as long as the resin sheet has a heat-shrinkable property, it can be used in this invention. Illustratively, when the heat-shrinkage rate of the heat-shrinkable resin sheet is low, the concaves, at least one of said concaves having an opening at its bottom portion formed thereon are generally small and shallow, but the depth and size of concaves, at least one of said concaves having an opening at its bottom portion on the sheet can be appropriately adjusted by increasing the intensity of the heat ray. When the heat shrinkage-initiating temperature is high in the heat-shrinkable resin sheet employed, the resulting concaves, at least one of said concaves having an opening at its bottom portion are shallow and small, but also in this case, the depth and size of the concaves, at least one of said concaves having an opening at its bottom portion can be appropriately adjusted by increasing the intensity of the heat ray.

Incidentally, in the instant specification and claims, the term "sheet" is used to include a film, a thin sheet and a sheet.

The materials of a base may be any of known materials capable of laminating together with the heat-shrinkable resin sheet. Examples of these materials to be used for making the base embrace various kinds of papers; cellophane; such resin sheets as of acetate type resins, polyolefin type resins such as polyethylene and polypropylene, polyvinyl chloride type resins, polyvinylidene chloride type resins, polystyrene type resins, polycarbonate type resins, polyvinyl alcohol type resins, polyamide type resins, polyester type resins and the like; various metallic plates and foils, various wooden sheets and plywoods, rubber sheets; and lamination films made by laminating any of them in accordance with an ordinary method. The base materials which are transparent or opaque, uncolored, or which are transparent or opaque, colored, may be employed.

Formation of a composite layer structure of the above-mentioned heat-shrinkable resin sheet and the above-mentioned base can be accomplished by a customary known method. For instance, an adhesive is coated on one of the heat-shrinkable resin sheet and the base, the other is applied on the adhesive-coated surface and they are bonded together by means of a roll or the like. Known adhesives such as emulsion type adhesives, heat-meltable adhesives, e.g., waxy adhesives, solvent type adhesives, e.g., lacquers, and thermosetting (reactive) adhesives may be used for the above bonding operation.

In the first method of this invention, at first a composite layer structure including a base, a heat-shrinkable resin sheet, a picture layer having heat insensitive picture areas and another picture layer having heat sensitive picture areas which is contiguous and closely adherent to said heat-shrinkable resin sheet and is co-ordinated with the picture areas of the first-mentioned picture layer is prepared. Formation of this composite layer structure can be accomplished by various procedures. Some of embodiments for formation of the composite layer structure are described below.

A picture layer of heat insensitive picture areas and/or a picture layer of heat sensitive picture areas is formed on a heat-shrinkable resin sheet or a base prior to formation of a composite layer structure of the heat-shrinkable resin sheet and the base, and then the heat-shrinkable resin sheet is combined with the base so that the heat insensitive picture areas and the heat sensitive picture areas are present in the state co-ordinated with each other. Thus is obtained a composite layer structure to be subjected to the heat ray-irradiating treatment. According to another embodiment, a heat-shrinkable resin sheet is positioned on a base to form a composite layer structure, a picture layer having heat insensitive picture areas is formed on the heat-shrinkable resin sheet side or the base side of the composite layer structure, and a picture layer having heat sensitive picture areas being co-ordinated with said heat insensitive picture areas is formed on the heat-shrinkable resin sheet side of the composite layer structure, whereby heat insensitive picture areas and heat sensitive picture areas which are co-ordinated with each other are formed on the composite layer structure. As pointed above, in this invention, concaves, at least one of said concaves having an opening at its bottom portion are formed by local shrinkage of the heat-shrinkable resin sheet caused by the heat energy absorbed selectively through the heat-sensitive picture areas, and it is therefore desired that the heat sensitive picture areas are formed in the state contiguous and closely adherent to the heat-shrinkable resin sheet.

Also in the second method of this invention, formation of a composite layer structure having heat insensitive picture areas and heat sensitive picture areas includes a variety of embodiments. For instance, prior to formation of a composite layer structure of a base and a heat-shrinkable resin sheet a heat sensitive picture areas are formed on the heat-shrinkable resin sheet and/or the base, the base is combined with the heat-shrinkable resin sheet to form a composite layer structure, the composite layer structure is irradiated with a heat ray in an amount sufficient for making an opening in the heat-shrinkable resin sheet to thereby cause the heat-shrinkable resin sheet to shrink locally and form concaves, at least one of said concaves having an opening at its bottom portion thereon, and then a picture layer having heat insensitive picture areas is applied on the resulting composite layer structure so that the heat insensitive picture areas are co-ordinated with the heat sensitive picture areas.

The positional relationship between heat insensitive and heat sensitive picture areas, and a composite layer structure of a base and a heat-shrinkable resin sheet will now be described. These heat insensitive and heat sensitive picture areas may be formed on the heat-shrinkable resin sheet, or they may be formed between the base and the heat-shrinkable resin sheet. In the latter case, the picture areas constitute an intermediate layer of the composite layer structure. Moreover, it is possible to adopt an embodiment where heat insensitive picture areas or heat sensitive picture areas are applied on the heat-shrinkable resin sheet or on one of the surfaces of the base and the heat-shrinkable resin sheet to be bonded, and the other picture areas are formed on the heat-shrinkable resin sheet or on the other of the surfaces of the base and the heat-shrinkable resin sheet.

As a method for forming a layer of heat sensitive picture areas and/or a layer of heat insensitive picture areas on a base and a heat-shrinkable resin sheet, there may be employed an ordinary printing method using an ink or paint such as a photogravure printing method, an offset printing method, a relief printing method, a screen printing method, an electrostatic printing method and a transfer printing method; a hand-picturing or hand-painting method using a pen or brush; and a picture-pasting method. Thus, there can be formed a desired pattern such as of letters, figures, symbols and/or pictures.

Known ink and paint compositions can be used for formation of heat insensitive picture areas and heat sensitive picture areas. For instance, it is possible to employ customary compositions comprising as a main ingredient a vehicle such as a drying oil, a synthetic resin, a processed or modified resin and a natural or synthetic rubber derivative; and incorporated therein such additives as a plasticizer, a stabilizer, a wax-grease, a dryer, an auxiliary dryer, a hardening agent, an emulsifier, a thickening agent, a dispersing agent, and a filler, and such a coloring material as a dye and a pigment, together with a solvent or diluent.

The "heat sensitive picture areas" are formed with an ink or paint composition containing a coloring material of the black type having a high heat ray absorbability or an ink or paint composition containing a heat ray absorber, and they have a higher heat ray absorption than the heat insensitive picture areas. It is preferred that the ink for forming heat sensitive areas comprises a heat-absorbing coloring agent.

In this invention, the heat insensitive picture areas and heat sensitive picture areas can be formed on the front or back surface of the base or the heat-shrinkable resin sheet, or on both the surfaces thereof.

According to the method of this invention, the so formed composite layer structure comprising a base, a heat-shrinkable resin sheet, a layer having heat insensitive picture areas and a layer having heat sensitive picture areas is irradiated with a heat ray to cause the heat-shrinkable resin to shrink locally and form concaves, at least one of said concaves having an opening at its bottom portion at portions corresponding to the heat sensitive picture areas. In carrying out this irradiation operation, an infrared ray is most preferably employed as the heat ray. As a source of the infared ray, there may be employed, for example, a filament lamp, a discharge lamp, an arc lamp or a flash lamp. It is preferable to employ a heat source capable of radiating a near infrared ray having a peak of spectral distribution in the near infrared region (wavelength being about $1.0\mu$), in which the difference of the heat absorption depending on the color in a material to be irradiated is greatest. For instance, it is preferable to employ a tungsten filament lamp containing a halogen gas, a xenon arc lamp, a mercury lamp and the like. Further, the intended irradiation effect can be sufficiently attained even with use of a commercial copying apparatus of the heating type.

In case the heat-shrinkable resin sheet or the base is colored, transmission of the radiated heat ray is sometimes inhibited to some extent. For this reason, it is preferred that the heat ray is irradiated from the side on which the heat-shrinkable resin sheet is positioned.

The size and depth of the concaves, at least one of said concaves having an opening at its bottom portion formed on the heat-shrinkable resin sheet by irradiation of the heat ray vary depending on various factors such as the kind of the resin, the shrinkage rate of the resin, the thickness of the resin sheet, the hue and concentration and the thickness of the heat sensitive picture areas, and irradiation speed adopted at the irradiation operation. Accordingly, it is preferable to choose appropriate conditions depending on the properties of materials constituting the composite layer structure.

Furthermore, according to the present invention, the heat-shrinkable resin sheet of the composite layer structure may be formed on its face with a coat layer for regulating gloss or luster of the surface of the composite layer structure or protecting the surface of the same.

In applying a cost or overcoat layer onto the composite layer structure to be employed in the method of this invention, there may be employed an ordinary coating method such as roll coating, gravure coating, bar coating, flow coating, dip coating, spray coating, using a resin composition obtained by well blending a resin, a filler, a solvent and the like; or there may be employed a lamination method wherein a film or sheet of resin is laminated on the composite layer structure by an ordinary method such as an adhesive lamination method, heat-fusion lamination method or the like. The resins to be employed in the above include, for example, natural or processed resins; synthetic resin such as an alkyd resin, a butylated aminolaldehyde resin, a phenolic resin, a vinyl type resin, an acrylic resin, an epoxy type resin, an urethane type resin, a butyral resin and the like; cellulose derivatives such as a nitrocellulose, acetylcellulose, autylbutylcellulose and the like; a rubber derivative; and the like. The films or sheets of resin to be employed in the above include, for example, those of a resin such as polyethylene, polypropylene, a polyester, polyvinylidene chloride, polystyrene, polycarbonate, polyvinyl alcohol, a polyamide or the like. As the fillers as mentioned above, there may be employed titanium oxide, alumina white, gypsum, silica, calcium carbonate, barium sulfate, clay and the like.

As described above, according to this invention, when the composite layer structure including a base, a heat-shrinkable resin sheet and a picture layer having heat sensitive picture areas with or without a picture layer having heat insensitive picture areas being coordinated with the heat sensitive picture areas is irradiated with a heat ray, the heat sensitive picture areas are selectively heated to a higher temperature than other areas. As a result, there is brought about a difference of the thermal shrinkage in the heat-shrinkable resin sheet. More specifically, the shrinkage is greater at portions corresponding to the heat sensitive picture areas than at other portions, with the result that concaves, at least one of said concaves having an opening at its bottom portion are formed at the portions corresponding to the heat sensitive picture areas.

The thus obtained decorative laminated structure contains the heat-shrinkable resin sheet having concaves, at least one of said concaves having an opening at its bottom portion formed locally at portions corresponding to the heat sensitive picture areas. At other portions, however, the heat-shrinkable resin sheet still retains the heat-shrinkability, and hence, when such decorative laminated structure is heated at a temperature exceeding the shrinkage-initiating point of the heat-shrinkable resin, the resin sheet undergoes post shrinkage, resulting in bending or folding of the decorative laminated structure. In order to improve such poor thermal properties and obviate above disadvantages, in accordance with a preferable embodiment of this invention, the laminated structure is subjected to the heat fixation treatment which will now be described below.

The decorative laminated structure is heated at a temperature higher than the shrinkage-initiating point and the second transition point but lower than the melting point by hot air, hot fluid, far-infrared ray or hot roll while fixing the peripheral ends of the structure so as to prevent occurrence of dimension change. It is desired that the temperature adopted at this operation is higher than the stretching temperature adopted for preparing the heat-shrinkable sheet. As the fixation temperature is higher, higher fixing effects are obtained. The temperature and time adopted for this high temperature fixation treatment vary depending on the kind of the heat-shrinkable resin sheet or materials constituting the laminated structure and the thickness thereof, or on the intended use of the resulting decorative laminated structure. Thus, it is preferable to choose suitable temperature and time conditions according to the case, taking into consideration the foregoing factors.

In order to fix the peripheral ends for preventing the shrinkage of the heat-shrinkable-resin sheet during the above high temperature fixation treatment, there may be employed an apparatus of the design substantially similar to that of an ordinary tentering machine used for woven fabrics. In this case, the laminated structure is heated while feeding the structure in such a state that both ears or sides are held by means of a plurality of clips having a width of about 2 to about 5 cm. The heat fixation may also be accomplished by employing a heating roll utilizing, as a heat source, electricity or steam. In this case, if the area of the laminated structure to be wound on the heating roll is increased, the dimensional change of the structure is avoided by the force of friction generated between the roll and the structure, and hence, use of clips is not needed.

By conducting the above-mentioned heat fixation treatment, the remaining heat shrinkability of the heat-shrinkable resin sheet can be greatly reduced, and at the same time, the shapes or configurations of the concaves, at least one of said concaves having an opening at its bottom portion formed by the heat ray irradiation treatment at portions corresponding to the heat sensitive picture areas can be kept substantially unchanged. However, use of too high a temperature is not preferred for maintenance of conditions of concaves, at least one of said concaves having an opening at its bottom portion. In practice, for example, when a heat-shrinkable polyester resin sheet having a thickness of $12\mu$ and a ratio of shrinkability of 40% at 100° C. is heated at 240° C. for 20 seconds by hot air while the peripheral ends are fixed, the sheet can be heat-fixed to such an extent that the shrinkability ratio is reduced to 1% at 100° C. Thus, preferable heat-fixing conditions can be simply determined based on simple experiments by those skilled in the art.

Thus, in accordance with one preferable aspect of this invention, there is provided a method of making a decorative laminated structure having a pattern composed of concaves, at least one of said concaves having an opening at its bottom portion which comprises forming a composite layer structure including a base, a heat-shrinkable resin sheet, a picture layer having heat insensitive picture areas and another picture layer having heat sensitive picture areas which is contiguous and closely adherent to said heat-shrinkable resin sheet and is co-ordinated with the heat insensitive picture areas of the first-mentioned picture layer, irradiating said composite layer structure with a heat ray in an amount sufficient for making an opening in the heat-shrinkable resin sheet to thereby cause said heat-shrinkable resin sheet to shrink locally and form concaves, at least one of said concaves having an opening at its bottom portion at portions contiguous and closely adherent to said heat sensitive picture areas, and further heat-treating the resulting laminated structure at elevated temperatures while supporting the structure at the peripheral ends thereof.

In accordance with another preferable aspect of this invention, there is provided a method of making a decorative laminated structure having a pattern of concaves, at least one of said concaves having an opening at its bottom portion which comprises forming a composite layer structure including a base, a heat-shrinkable resin sheet and a picture layer having heat sensitive picture areas which is contiguous and closely adherent to said heat-shrinkable resin sheet, irradiating said composite layer structure with a heat ray in an amount sufficient for making an opening in the heat-shrinkable resin sheet to thereby cause the heat-shrinkable resin sheet to shrink locally and form concaves, at least one of said concaves having an opening at its bottom portion at portions contiguous and closely adherent to said heat sensitive picture areas, applying a picture layer having picture areas onto said heat-shrinkable resin sheet of the composite layer structure so that the picture areas of said picture layer are co-ordinated with said concaves, at least one of said concaves having an opening at its bottom portion formed on the heat-shrinkable resin sheet, and further heat-treating the resulting laminated structure at elevated temperatures while supporting the structure at the peripheral ends thereof.

As is apparent from the foregoing description, according to this invention, when a composite layer structure including a base, a heat-shrinkable resin sheet and a picture layer having heat sensitive picture areas with or without a picture layer having heat insensitive picture areas is irradiated with a heat ray to thereby cause the heat-shrinkable resin sheet to shrink locally and form concaves, at least one of said concaves having an opening at its bottom portion at portions contiguous and closely adherent to said heat sensitive picture areas, and if the composite layer structure includes no picture layer having heat insensitive picture areas such picture layer having heat insensitive picture areas is applied on the heat-shrinkable resin sheet of the resulting laminated structure so that the heat insensitive picture areas are co-ordinated with said concaves, at least one of said concaves having an opening at its bottom portion formed on said heat-shrinkable resin sheet, there can be obtained a decorative laminated structure having on the surface a pattern of concaves, at least one of said concaves having an opening at its bottom portion in which the heat sensitive picture areas present at portions corresponding to said concaves, at least one of said concaves having an opening at its bottom portion are well co-ordinated with heat insensitive picuture areas, which pattern is excellent in strength, durability and full of beauty, reality and which exhibits excellent decorative and three-dimensional effects.

Moreover, it will readily be understood that in this invention, since the picture layer having heat sensitive picture areas can be easily formed by printing or the like to render the pattern of the heat sensitive picture areas fine and delicate, it is possible to form a corresponding fine and delicate pattern of concaves, at least one of said concaves having an opening at its bottom portion on the heat-shrinkable resin sheet at portions corresponding to the heat sensitive picture areas, thus affording to the resulting laminated structure a high reality and a decorative effect, which are further enhanced by the heat insensitive picture areas formed so that they are well co-ordinated with the concaves, at least one of said concaves having an opening at its bottom portion, i.e., the heat sensitive picture areas. Further, also the heat insensitive picture areas can be easily formed by printing or the like. Thus, according to this invention, such a delicate and fine pattern including concaves, at least one of said concaves having an opening at its bottom portion as not attainable at all in the conventional methods can be easily obtained.

Further, since concaves, at least one of said concaves having an opening at its bottom portion in this invention are formed not by such mechanical means as embossing rolls or mold plates but by utilizing the difference in temperature caused by the difference in heat absorption in the heat-shrinkable resin sheet, the size and depth of concaves, at least one of said concaves having an opening at its bottom portion can be easily adjusted by changing the heat absorption at the heat sensitive picture areas, with the result that a decorative laminated structure of greater reality can be obtained.

Still further, when heat sensitive picture areas are formed directly on the surface of the heat-shrinkable resin sheet, concaves, at least one of said concaves having an opening at its bottom portion formed on the heat-shrinkable resin sheet can be colored with a hue equal to that of the heat sensitive picture areas.

Still in addition, according to this invention, formation of such decorative laminated structure can be accomplished without employing a metallic mold roll or metallic mold plate as used in the conventional methods, only by inserting a heat ray irradiator in the printing step. As a result, desired decorative laminated structures can readily be mass-produced at low costs.

Moreover, when the resulting laminated structure is subjected to the heat fixation treatment according to preferable embodiments of this invention, the fastness and resistance of the decorative laminated structure, especially heat resistance and thermal characteristics, can be highly improved.

Decorative laminated structures of this invention have, alone or in combination with other structures, a wide variety of uses, for example, not only as materials for ceilings, floors, walls and interior decorations of buildings, cars, ships and the like, but also as decorative materials for furnitures, fittings, tables, musical instruments, cabinets and the like.

This invention is now illustrated in connection with the accompanying drawings, but not limited, by the following examples, in which the shrinkability ratio of the heat-shrinkable sheet was determined according to the method of ASTM D1204 under conditions of 100° C. and 5 minutes. Each of drawings is respectively a cross-sectional view showing each of so many modes of a decorative laminated structure and a method for making thereof according to the present invention.

EXAMPLE 1

Figure 1B:
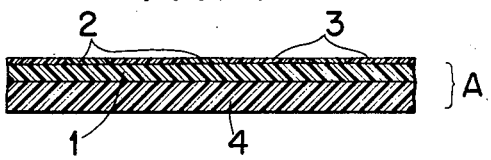
Figure 1C:
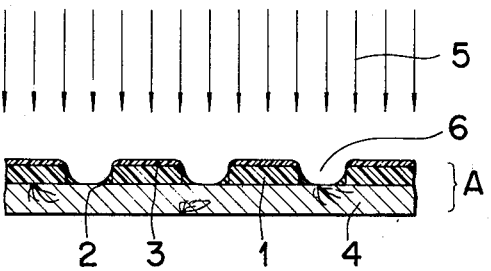

As is illustrated in FIG. 1-a, a picture 2 of duct groove portions of a pattern of grains of wood was gravure-printed on a heat shrinkable polyvinyl chloride resin film 1 (manufactured and sold by Mitsubishi Plastics, Ind., Ltd., Japan Trade name: HISHIREX-502. Shrinkage rate: laterally 45–50%. Thickness: 40$\mu$) with use of a dark ink composition comprising as a vehicle a vinyl chloride-vinyl acetate copolymer.

Also as illustrated in FIG. 1-a, a pattern 3 of grains of wood co-ordinating with the above picture 2 of the duct groove portions was gravure-printed on the above heat-shrinkable polyvinyl chloride resin film 1 with use of a brown ink composition comprising as a vehicle a vinyl chloride-vinyl acetate copolymer.

Then, as illustrated in FIG. 1-b, a brown-colored heat-resistant polyvinyl chloride sheet 4 (manufactured and sold by Riken Vinyl Ind. Co., Ltd., Japan. Trade name: Riken Film FC-4648. Thickness: 100$\mu$) was bonded onto the back surface of the heat-shrinkable polyvinyl chloride resin film 1 having the pattern 3 of grains of wood and the pattern 2 of duct groove portions, through an adhesive of the vinyl chloride-vinyl acetate copolymer type to obtain a composite layer structure A.

The resulting composite layer structure A was irradiated with an infrared ray 5 at an irradiation speed of 6.9 cm/sec. over the printed surface of the structure A with use of a heating type copying machine (manufactured and sold by Duplo Manufacturing Co. Trade name: Duplo Fax-631), as is illustrated in FIG. 1-c. As a result, the duct groove portions 2 were bored and concaves 6 at least one of said concaves having an opening at its bottom portion colored with a color of the portions 2 were formed. Thus was obtained a decorative laminated structure having a three-dimensional pattern.

The above procedures were repeated by employing a lined paper having the surface brown-colored (manufactured and sold by Kohjin Co., Ltd., Japan. Trade name: WK-130. Thickness: 230$\mu$) instead of the heat-resistant polyvinyl chloride resin sheet 4 and using an ethylene-vinyl acetate copolymer adhesive. Thus was obtained a wall paper having a three-dimensionally decorated face.

The above procedures were repeated in the same manner except that a pattern 3 of grains of wood was first applied and a pattern 2 of duct groove portions was then applied. A similar decorative laminated structure exhibiting a similar decorative effect was obtained.

Further, the above procedures were repeated by employing instead of the above heat-shrinkable polyvinyl chloride resin film, a heat-shrinkable polyvinylidene chloride resin film, a polyester film, a polyamide film, a polystyrene film, a polyethylene film or a polypropylene film. In each case, a decorative laminated structure having a three-dimensional effect similar to that of the product obtained above, was obtained.

EXAMPLE 2

Figure 2:
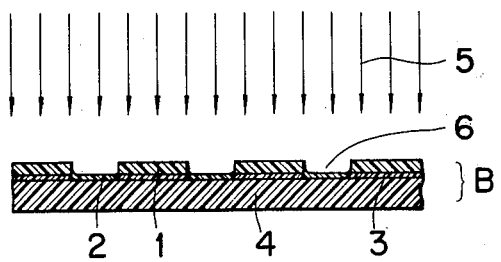

Colored figure portions 2 of an arabesque design were gravure-printed, as illustrated in FIG. 2, on a rigid polyvinyl chloride resin film 4 (manufactured and sold by Kobe Resin Co., Ltd., Japan. Trade name: BONLOID. Thickness: 100$\mu$) with use of a black ink composition comprising as a vehicle a polyvinyl chloride resin. A graduation design 3 co-ordinating with the colored figure portions 2 was gravure-printed with use of a green ink composition comprising as a vehicle a polyvinyl chloride resin.

A heat-shrinkable polyvinyl chloride resin film 1 (manufactured and sold by Mitsubishi Plastics Ind., Ltd., Japan. Trade name: HISHIREX. Thickness: 40$\mu$. Shrinkage rate: laterally 45–50% ) was bonded to the printed surface of the above rigid polyvinyl chloride film 4 through a vinyl chloride-vinyl acetate copolymer adhesive to obtain a composite layer structure B.

As is illustrated in FIG. 2, the structure B was irradiated with an infrared ray 5 at an irradiation speed of 4.7 cm/sec. by means of the same heating type copying machine as used in Example 1. As a result, colored figure portions 2 were bored and concaves 6 at least one of said concaves having an opening at its bottom portion colored with a color of the portions 2 were formed.

Thus was obtained a decorative laminated structure having a three-dimensional effect.

A similar decorative laminated structure having a three-dimensional effect was obtained by conducting the above procedures in the same manner except that colored figure portions 2 and the graduation design 3 were formed not on the rigid polyvinyl chloride resin film 4 but on the back surface of the heat-shrinkable polyvinyl chloride resin film 1 and the film 4 was bonded to the printed surfaces of the film 1 to obtain a composite laminated structure B, which was treated in the same manner as above.

EXAMPLE 3

Figure 3:
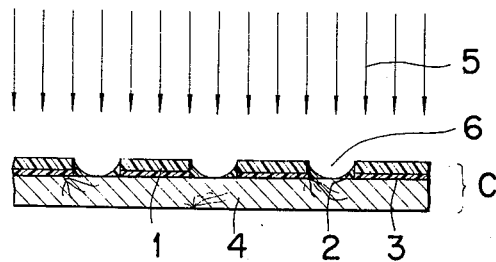

As is shown in FIG. 3, duct groove portions of a pattern of grains of wood were printed on a heat-shrinkable polypropylene film 1 (manufactured and sold by Kohjin Co., Ltd., Japan. Trade name: POLYSET. Thickness: 30μ) with use of a black ink composition comprising as a vehicle a polyamide resin.

A pattern 3 of grains of wood co-ordinating with the duct groove portions 2 was gravure-printed on the back surface of the above heat-shrinkable film 1 with use of a brown ink composition comprising as a vehicle a polyamide resin.

Then, as is illustrated in FIG. 3, a light brown-colored, thick paper 4 (manufactured and sold by Kojin Co., Ltd., Japan. Trade name: WK-130. Base weight: 130 g/m$^2$) was bonded to the surface of the heat-shrinkable film 1, on which the pattern 3 of grains of wood had been printed, through an ethylene-vinyl acetate copolymer adhesive to obtain a composite layer structure C.

As is illustrated in FIG. 3, the composite layer structure C was irradiated over the heat-shrinkable film 1 with an infrared ray 5 at an irradiation speed of 4.7 cm/sec. by employing the same heating type copying machine as used in Example 1. As a result, the duct groove portions 2 were bored, and concaves 6 at least one of said concaves having an opening at its bottom portion colored with a color of the groove portions 2 were formed. Thus was obtained a decorative laminated structure having a three-dimensional effect.

The above procedures were repeated in the same manner except that the pattern 3 of grains of wood was printed on the front surface of the heat-shrinkable polypropylene film 1 and the duct groove portions 2 were printed on the back surface of the film 1 instead of printing the pattern 3 of grains of wood on the back surface of the film and the duct groove portions 2 on the front surface of the film 1. Thus was obtained a decorative laminated structure same as the above product except that the pattern of grains of wood was presented on the surface.

EXAMPLE 4

Figure 4:
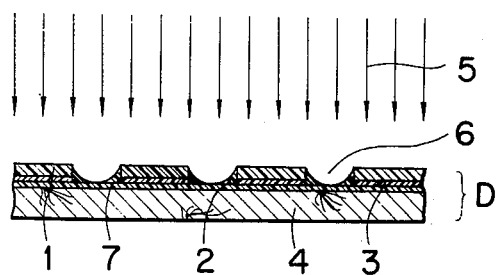

A solid brown-colored layer 7 was formed by gravure-printing on the surface of a stencil paper 4 (manufactured and sold by Tokushu Paper Making Co., Japan. Trade name: S-VELUM. Base weight: 80 g/m$^2$), as illustrated in FIG. 4.

A pattern 3 of grains of wood was gravure-printed on the layer 7 with use of a brown ink composition comprising as a vehicle a polyvinyl chloride resin.

Then, a heat-shrinkable polyester film 1 (product of Mitsubishi Plastics Ind., Ltd., Japan. Thickness: 12μ) was applied on the surface of the stencil paper 4, on which the pattern 3 of grains of wood had been printed, through a polyester resin adhesive to obtain a composite layer structure.

Duct groove portions 2 co-ordinating with the pattern 3 of grains of wood were printed on the heat-shrinkable film 1 of the above composite layer structure with use of a brown ink composition comprising as a vehicle a polyester resin to obtain a composite laminated structure D.

The structure D was irradiated with an infrared ray 5 at an irradiation speed of 3.2 cm/sec. over the heat-shrinkable film 1 of the composite layer structure D by employing the same heating type copying machine as used in Example 1, in a manner as illustrated in FIG. 4. As a result, the duct groove portions 2 were bored and concaves 6 at least one of said concaves having an opening at its bottom portion colored with a color of the duct groove portions 2 were formed. Thus a decorative laminated structure having a three-dimensional effect was obtained.

In case the composite layer structure D was prepared by printing the duct groove portions 2 on the heat-shrinkable resin film 1 prior to bonding the film 1 to the stencil paper 4, a decorative laminated structure exhibiting a similar three-dimensional effect was obtained.

EXAMPLE 5

Figure 5:
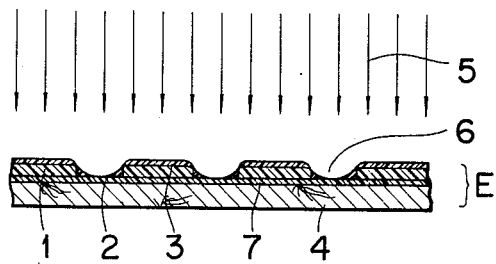
Figure 10A:
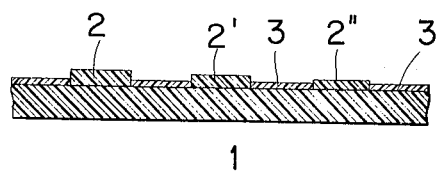
Figure 10B:
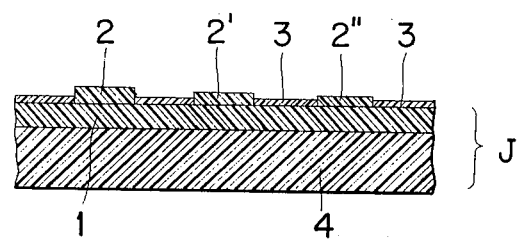
Figure 10C:
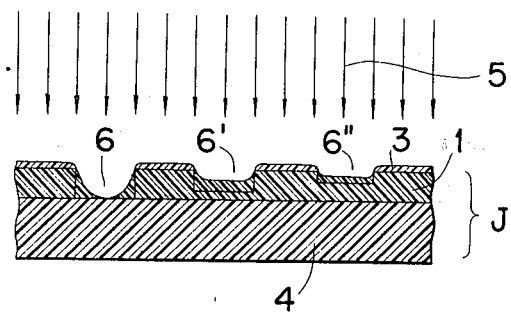
Figure 10D:
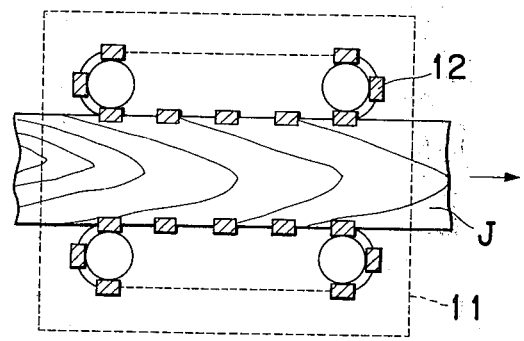

As is illustrated in FIG. 5, a solid brown-colored layer 7 was formed by gravure-printing on a lined paper 4 (manufactured and sold by Kohjin Co., Ltd., Japan. Trade name: WK-80. Base weight: 80 g/m$^2$) with use of a brown ink composition comprising as a vehicle a vinyl chloride-vinyl acetate copolymer resin.

Then, a heat-shrinkable polyvinyl chloride resin film 1 (manufactured and sold by Nippon Carbide Ind., Co., Ltd., Japan. Trade name: Hi-S Film #111L Shrinkage rate: laterally 50% and longitudinally 5%. Thickness: 40μ) was bonded on the side of the solid colored layer 7 of the lined paper 4 with use of an ethylene-vinyl acetate copolymer adhesive.

Duct groove portions 2 and a pattern 3 of grains of wood were applied on the surface of the heat-shrinkable film of the above bonded assembly in the same manner as in Example 1 to obtain a composite layer structure E.

Then, as illustrated in FIG. 5, the composite layer structue E was irradiated with an infrared ray 5 at an irradiation speed of 7.5 cm/sec. from the printed surface side of the composite layer structure E by employing the same heating type copying machine as used in Example 1. As a result, boring of the heat-shrinkable film was caused to occur in the same manner as in Example 1, and a decorative laminated structure exhibiting a three-dimensional effect similar to that of the product of Example 1 was obtained.

Similar decorative laminated structures were obtained by employing, instead of the above heat-shrinkable polyvinyl chloride resin film, a heat-shrinkable polyvinylidene chloride film, a polyester film, a polyamide film, a polystyrene film, a polyethylene film and polypropylene film.

Also similar decorative laminated structures were obtained by employing, instead of the above lined paper 4 with the surface coated with the solid colored layer 7, a brown-colored aluminum foil, an asbestos paper and a colored polyvinyl chloride film.

EXAMPLE 6

As is shown in FIG. 6, an acrylic resin (manufactuted and sold by Rohm und Hass. Trade name: PALALOID B-66.) containing, dispersed therein, 5% by weight of silica as a delustrant (manufactured and sold by Fuji Davison Chemical Co., Ltd., Japan. Trade name: SYLOID 308) was coated on the entire of the printed surface of the composite layer structure E obtained in Example 5 to form a composite layer structure F having a delustered transparent layer 8 having a thickness of about 3μ.

Then, as is illustrated in FIG. 6, the composite layer structure F was irradiated with an infrared ray 5 at an irradiation speed of 8.3 cm/sec. from the side of the transparent layer 8 by using the same heating type copying machine as employed in Example 1. As a result, the duct groove portions 2, together with transparent layer 8, were bored and caused to cave in, forming concaves 6' at least one of said concaves having an opening at its bottom portion which were colored with a color of the duct groove portions 2 and co-ordinated with the pattern 3 of grains of wood. Thus was obtained a decorative laminated structure having a pattern excellent in the three-dimensional effect.

EXAMPLE 7

As is illustrated in FIG. 7-a, duct groove portions 2 of a wood grain pattern were gravure-printed on a heat-shrinkable polyvinyl chloride resin film 1 (manufactured and sold by Mitsubishi Plastics Ind., Ltd., Japan. Trade name: HISHIREX-502. Thickness: 40μ. Shrinkage rate: laterally 45–50%) with use of a black ink composition comprising as a vehicle a vinyl chloride-vinyl acetate copolymer.

Also as is illustrated in FIG. 7-a, a heat-resistant polyvinyl chloride sheet 4, which had been coated with a vinyl chloride-vinyl acetate copolymer adhesive and then colored into brown, was bonded to the back surface of the heat-shrinkable polyvinyl chloride resin film 1 with the front surface being printed with duct groove portions 2, to thereby form a composite layer structure G.

Then, as is illustrated in FIG. 7-a, the composite layer structure G was irradiated with an infrared ray 5 at an irradiation speed of 6.5 cm/sec. from the side of the printed surface of the composite layer structure G by employing a heating type copying machine (manufactured and sold by Duplo Manufacturing Co., Japan. Trade name: Duplo Fax-63). As a result, the duct groove portions 2 were bored and caused to cave in, forming concaves 6 at least one of said concaves having an opening at its bottom portion colored with a color of the duct groove portions 2.

Then, as is illustrated in FIG. 7-b, a pattern 3 of grains of wood co-ordinating with the duct groove portions 2 was gravure-printed on the composite layer structure having the concaves 6 at least one of said concaves having an opening at its bottom portion formed thereon, with use of a brown ink composition comprising as a vehicle a vinyl chloride-vinyl acetate copolymer. Thus was obtained a decorative laminated structure having a pattern excellent in the three-dimensional effect.

A decorative wall paper having a three-dimensionally decorated face similar to that of the above decorative structure was similarly obtained by employing, instead of the above heat-resistant polyvinyl sheet 4, a lined paper (manufactured and sold by Kohjin Co., Ltd., Japan. Trade name: WK-130. Thickness: 230μ) having the surface colored in brown, and an ethylene-vinyl acetate copolymer adhesive for the bonding.

Similar decorative laminated structures were prepared by conducting the above procedures by employing, instead of the heat-shrinkable polyvinyl chloride resin film, a heat-shrinkable polyvinylidene chloride film, a polyester film, a polyamide film, a polystyrene film, a polyethylene film and a polypropylene film.

EXAMPLE 8

As is illustrated in FIG. 8-a, a solid brown-colored layer 7 was gravure-printed on the surface of a stencil paper 4 (manufactured and solid by Tokushu Paper Making Co., Japan Trade name: S-VELUM. Base weight: 80 g/m²).

Also as illustrated in FIG. 8-a, the above stencil paper 4 was bonded to a heat-shrinkable polyester film 1 (manufactured by Mitsubishi Plastics Ind., Ltd., Japan. Thickness: 12μ) to form a composite layer structure H. Then, duct groove portions 2 of a pattern of grains of wood were gravure-printed on the film 1, and concaves 6 at least one of said concaves having an opening at its bottom portion were formed at portions corresponding to the duct groove portions 2 by employing the same heating type copying machine as used in Example 1.

Then, as is illustrated in FIG. 8-b, on the heat-shrinkable polyester film 1 having concaves 6 at least one of said concaves having an opening at its bottom portion formed thereon, a pattern 3 of grains of wood co-ordinating with the pattern of the concaves with openings 6 was gravure-printed to obtain a decorative laminated structure having a pattern excellent in the three-dimensional effect.

Similar decorative laminated structures were obtained by repeating the above procedures by employing, instead of the above heat-shrinkable polyester resin film, a polyvinylidene resin film, a polyvinyl chloride resin film, a polyamide resin film, a polystyrene resin film, a polyethylene resin film and a polypropylene resin film.

Also similar decorative laminated structures were obtained by repeating the above procedures by employing, instead of the lined paper 4, a brown-colored aluminum foil, an asbestos paper and a colored polyvinyl chloride film.

EXAMPLE 9

As is illustrated in FIG. 9-a, duct groove portions 2 of a pattern of grains of wood were gravure-printed on a thick paper A (manufactured and sold by Kohjin Co., Ltd., Japan. Trade name: WK-130. Base Weight: 130 g/m²) having the surface colored in a light brown color, with use of a black ink composition comprising as a vehicle a polyamide resin.

Then, as is shown in FIG. 9-a, a heat-shrinkable polypropylene film 1 (manufactured and sold by Kohjin Co., Ltd., Japan. Trade Name: POLYSET. Thickness of 30μ) was coated on the above thick paper 4 with use of an ethylene-vinyl acetate copolymer adhesive to form a composite layer structure I. Then, the composite layer structure was irradiated with an infrared ray 5 at an irradiation speed of 4.7 cm/sec. by employing the same heating type copying machine as used in Example 1. As a result, the heat-shrinkable film was opened and bored at portions corresponding to the duct groove portions 2 to form concaves at least one of said concaves having an opening at its bottom portion.

Then, as is illustrated in FIG. 9-b, a pattern 3 of grains of wood co-ordinating with the pattern of the concaves with openings 6 was gravure-printed on the surface of the heat-shrinkable film of the above composite layer structure with use of a brown ink composition comprising the same vehicle as of the ink used for formation of the duct groove portions 2, to thereby obtain a decorative laminated structure.

EXAMPLE 10

As is illustrated in FIG. 10-a, deep-colored duct groove portions 2 and faintly-colored duct groove portions 2' a pattern of grains of wood were gravure-printed on a heat-shrinkable polyvinyl chloride resin film 1 (manufactured and sold by Mitsubishi Plastics Ind. Ltd., Japan. Trade name: HISHIREX 502-Z. Shrinkage rate: laterally of 45–50%. Thickness: 40μ) with use of dark black ink composition comprising as a vehicle a vinyl chloride-vinyl acetate copolymer. And similarly, duct groove portions 2" were printed in the same manner as the above except that a dark brown ink composition is used.

Then, also as illustrated in FIG. 10-a, a pattern 3 of grains of wood co-ordinating with said duct groove portions 2, 2' and 2" was gravure-printed on the heat-shrinkable polyvinyl chloride resin film 1 with use of a light brown ink composition comprising as a vehicle a vinyl chloride-vinyl acetate copolymer.

Then, as is illustrated in FIG. 10-b, on the back surface of the heat-shrinkable resin film 1 with the front surface being printed with the pattern 3 of grains of wood and duct groove portions 2, 2' and 2" a cream colored heat-resistant polyvinyl chloride sheet 4 (manufactured and sold by Riken Vinyl Ind. Co., Ltd., Japan. Trade name: FC-4648 Thickness: 100μ) was applied through a vinyl chloride-vinyl acetate copolymer adhesive, to thereby form a composite layer structure J.

Then, as is illustrated in FIG. 10-c, the composite layer structure J was irradiated from the printed surface side thereof with an infrared ray 5 at an irradiation speed of 7.5 cm/sec. to supply an energy sufficient to cause the deep-colored duct groove portions 2 only to cave in and open at the bottom portions thereof by employing a heating type copying machine (manufactured and sold by Duplo Manufacturing Co., Japan. Trade name: Duplo Fax-631). As a result, the duct groove portions 2 were caused to cave in to form concaves 6 with openings at portions corresponding to said deep-colored duct groove portions 2, and the duct groove portions 2' and 2" were caused to cave in to form concaves 6' and 6", said concaves 6, 6' and 6" were colored with a color of the duct groove portions 2, 2' and 2", respectively. Thus was obtained a decorative laminated structure of a pattern having a three-dimensional effect.

Then, as is illustrated in FIG. 10-d, the composite layer structure J was subjected for 20 seconds to a heat fixation treatment in a hot air furnace 11 maintained at 140° C. while both ends of the structure J being fixed with clips 12 to thereby reduce the remaining heat shrinkage rate of the heat-shrinkable polyvinyl chloride resin film 1 to 15%.

A composite layer structure was prepared by repeating the above procedures by employing, instead of the heat-resistant polyvinyl chloride sheet base 4, a lined paper (manufactured and sold by Kohjin Co., Ltd., Japan. Trade name: WK-130. Thickness: 230μ) whose surface had been colored into cream, and an ethylene-vinyl acetate copolymer adhesive, and the composite layer structure was irradiated with an infrared ray and subjected to a heat fixation treatment in the same manner as above, to thereby obtain a three-dimensional wall paper excellent in heat resistance.

The above procedures were repeated in the same manner except that a transparent polyvinyl chloride film (manufactured and sold by Kobe Resin Co. Ltd., Japan. Trade name: BONLOID. Thickness: 100μ) was coated on the base 4 and the infrared ray radiation was effected from the direction reverse to the above, i.e., from the polyvinyl chloride film side of the base 4, at an irradiation speed of 6.0 cm/sec., followed by the heat fixation treatment, whereby a decorative laminated structure having a pattern of a three-dimensional effect similar to that of the above decorative laminated structure was obtained.

Similar decorative laminated structures having a pattern of a three-dimensional effect were prepared by repeating the above procedures by employing, instead of the heat-shrinkable polyvinyl chloride resin film, a heat-shrinkable polyvinylidene type film, a polyester type film, a polyamide type film, a polystyrene type film, a polyethylene type film and a polypropylene type film.

When, in the above-mentioned procedures for forming the decorative laminated structure and wall paper, the heat-shrinkable film 1 was at first bonded to the base 4 and duct groove portions 2, 2' and 2" and wood grain pattern 3 were printed on the surface of the heat-shrinkable film 1, products exhibiting similar decorative effects were obtained.

EXAMPLE 11

Figure 11A:
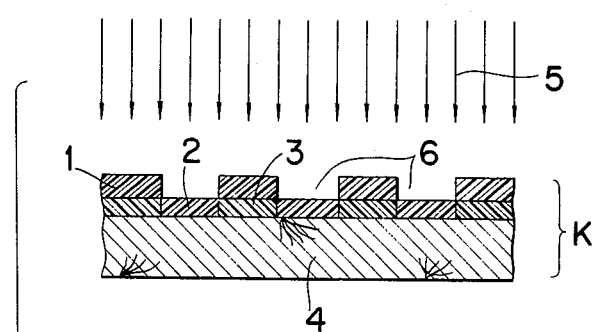
Figure 11B:
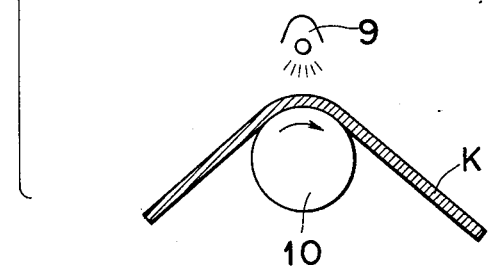

As is illustrated in FIG. 11-a, duct groove portions 2 of a wood grain pattern were gravure-printed on a heat-shrinkable polyester film 1 (manufactured and sold by Mitsubishi Plastics Ind. Ltd., Japan. Trade name DIAFOIL HS. Average heat shrinkage rate: 40%. Thickness: 12μ) with use of a dark black ink composition comprising as a vehicle a polyester resin.

Then, a pattern 3 of wood grains co-ordinating with the duct groove portions 2 was further gravure-printed on the heat-shrinkable resin film 1 with use of a brown ink composition comprising the same vehicle as of the above dark black ink composition.

Then, a stencil paper 4 (manufactured and sold by Tokushu Paper Making Co., Japan. Trade name: S-VELUM. Base weight: 80 g/m$^2$), the surface of which had been colored in brown, was bonded to the heat-shrinkable polyester film 1 on the side on which the wood grain pattern 3 and duct groove portions 2 had been printed, to thereby form a composite layer structure K.

Then, as illustrated in FIG. 11-b, the composite layer structure L placed on a roll 10 was irradiated at an irradiation speed of 3.0 cm/sec. by employing a near infrared ray lamp 9 (manufactured by Ushio Electric Inc., Japan; 200 V and 1.2 KW) from the side of the heat shrinkable resin film 1 of the composite layer structure K. As a result, concaves with openings were formed on the surface of the heat-shrinkable resin film 1 at portions corresponding to the duct groove portions 2. Said concaves with openings were well agreed with the duct groove portions 2. Then, in the same manner as in Example 10, the composite layer structure L was subjected to a heat fixation treatment for 30 seconds in a hot air furnace maintained at 240° C., while keeping the size of the structure L constant. As a result, the remaining heat shrinkage rate of the heat-shrinkable polyester film 1 was reduced to 1%, and a decorative laminated structure having a three-dimensional pattern was obtained.

The above procedures were repeated by employing as the base 4 a polyester film (manufactured and sold by Mitsubishi Plastics Ind. Ltd., Japan. Trade name: LUMIRROR. Thickness: 50μ) and irradiating the resulting composite layer structure at an irradiation speed of 2.2 cm/sec. in the direction reverse to the above, i.e., from the side of the polyester film base 4, followed by the heat fixation treatment. As a result, a decorative laminated structure exhibiting similar decorative effects was obtained.

EXAMPLE 12

Figure 12:
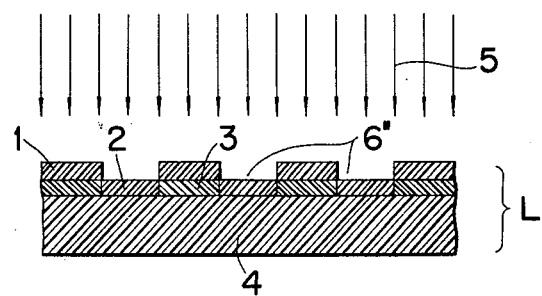

Colored figure portions 2 of an arabesque design were gravure-printed on a rigid polyvinyl chloride resin film 4 (manufactured and sold by Kobe Resin Co. Ltd., Japan. Trade name: BONLOID. Thickness: 100μ) with use of a black ink composition comprising as a vehicle a polyvinyl chloride resin, as illustrated in FIG. 12, and a graduation design 3 co-ordinating with colored figure portions 2 was gravure-printed with use of a green ink composition comprising the same vehicle as that of the above black ink.

Then, a heat-shrinkable polyvinyl chloride resin film 1 (manufactured and sold by Mitsubishi Plastics Ind. Ltd., Japan. Trade name: HISHIREX. Shrinkage rate: laterally 40–50%. Thickness: 40μ) was bonded on the printed surface of the rigid polyvinyl chloride resin film 4 to obtain a composite layer structure L. Then, also as illustrated in FIG. 12, the composite layer structure L was irradiated with an infrared ray 5 at an irradiation speed of 4.7 cm/sec. by employing the same heating type copying machine as used in Example 10. As a result, the colored figure portions 2 were bored, forming concaves 6" at least one of said concaves having an opening at its bottom portion. The resulting composite laminated structure L was subjected to the heat fixation treatment in the same manner as in Example 10 to obtain a decorative laminated structure having a three-dimensional pattern and excellent in heat resistance, in which the bored concaves with openings 6" were colored with a color of the colored figure portions 2.

EXAMPLE 13

Figure 13A:
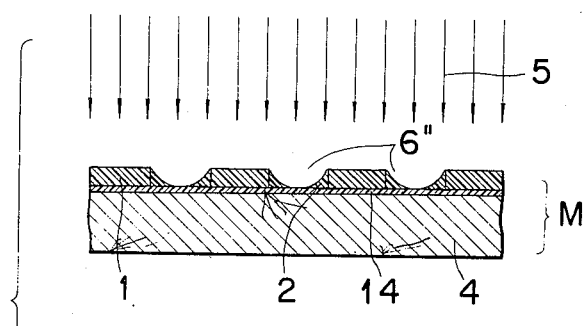
Figure 13B:
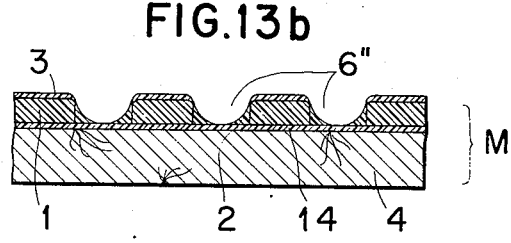

As is illustrated in FIG. 13-a, a solid, brown-colored layer 14 was gravure-printed on the entire surface of a stencil paper 4 (manufactured and sold by Tokushu Paper Making Co., Japan. Trade name: S-VELUM. Base weight: 80 g/m²).

Then, also as illustrated in FIG. 13-a, the above stencil paper 4 was bonded to a heat-shrinkable polyester film 1 (manufactured by Mitsubishi Plastics Ind. Ltd., Japan. Thickness: 12μ) to obtain a composite layer structure M. Duct groove portions 2 of a wood grain pattern were gravure-printed on the film 1 and bored concaves 6" were formed at portions corresponding to the duct groove portions 2 by employing the same heating type copying machine as used in Example 10.

Then, as is illustrated in FIG. 13-b, a pattern 3 of grains of wood co-ordinating with the pattern of the concaves with openings 6" was gravure-printed on the heat-shrinkable polyester film with the concaves with openings 6" bored thereon, and the composite layer structure was subjected to the heat fixation treatment in the same manner as in Example 10 to obtain a decorative laminated structure having a pattern full of the three-dimensional effect.

Similar decorative laminated structures were obtained by repeating the above procedures by employing instead of the above heat-shrinkable polyester film 1, a heat-shrinkable polyvinyl chloride resin film, a heat-shrinkable polyvinylidene chloride film, a polyamide resin film, a polystyrene resin film, a polyethylene resin film and a polypropylene resin film. Also similar decorative laminated structures were prepared by repeating the above procedures by employing, instead of the above stencil paper 4, a brown-colored aluminum foil, an asbestos paper and a colored polyvinyl chloride film.

What is claimed is:

1. A decorative laminated structure having a pattern of concaves and convexes, at least one of said concaves having an opening at its bottom portion, and which consists essentially of a base sheet, a heat-shrinkable resin sheet, a picture layer having a plurality of heat-sensitive picture areas formed of a heat-sensitive ink composition and contiguous and adhered to said heat-shrinkable resin sheet said heat-shrinkable resin sheet having formed on the surface thereof concave portions, at least one of said concave portions having an opening at its bottom, said concave portions corresponding to said heat-sensitive picture areas of the picture layer.

2. A decorative laminated structure set forth in claim 1, wherein the remaining heat-shrinkability of the heat-shrinkable resin sheet is fixed by a heat treatment conducted at elevated temperatures while keeping the dimension of the structure constant.

3. A decorative laminated structure set forth in claim 1, wherein the heat-shrinkable resin sheet having concave portions, at least one of said concave portions having an opening at its bottom, is formed on its overall surface with an overcoat layer for protecting and/or delustering said surface.

4. A decorative laminated structure set forth in claim 1, wherein the heat-shrinkable resin sheet is a thermoplastic resin sheet stretched in a predetermined direction.

5. A decorative laminated structure set forth in claim 4, wherein the thermoplastic resin sheet is a sheet of a member selected from the group consisting of polyvinyl chloride resins, polyvinylidene chloride resins, polyolefin resins, polystyrene resins, polyester resins, polycarbonate resins, polyvinyl alcohol resins, cellulose resins and rubber resins.

6. A decorative laminated structure set forth in claim 1, wherein the base is composed of a material capable of adhering to the heat-shrinkable resin sheet through the medium of an adhesive.

7. A decorative laminated structure set forth in claim 1, wherein the heat-sensitive ink composition comprises a heat-absorbing coloring agent.

8. A decorative laminated structure set forth in claim 1, wherein the concave portions, at least one of said concave portions having a opening at its bottom, formed on the heat-shrinkable resin sheet are colored with a color of the heat-sensitive picture areas.

9. A method of making a decorative laminated structure having a predetermined surface pattern of convexes and concaves, at least one of said concaves being perforated, said concaves corresponding to picture areas of said laminated structure of a heat-sensitive ink composition containing a heat-absorbing coloring agent; and comprising printing a predetermined pattern of heat-sensitive picture areas on a surface of a heat-shrinkable resin sheet, said heat-sensitive picture areas being a heat-sensitive ink composition containing a heat-absorbing coloring agent; adhering a base sheet to one of the surfaces of said heat-shrinkable resin sheet to form an integral composite material; and irradiating the resultant composite material with an infrared or near infrared heat ray for a sufficient time such that heat energy is preferentially absorbed by said heat-sensitive ink composition causing said heat shrinkable resin sheet to shrink locally and form said concaves at areas corresponding to said heat-sensitive picture areas and causing at least one of said concaves to perforate.

10. The method of claim 9 wherein said base is adhered to the surface of said heat shrinkable resin sheet having said heat-sensitive picture areas thereon.

11. The method of claim 9 wherein said base is adhered to the surface of said heat-shrinkable resin sheet opposite the surface having said heat-sensitive picture areas printed thereon.

12. The method of claim 9 wherein a pattern of heat-insensitive picture areas having a predetermined positional relationship with respect to said heat-sensitive picture areas is printed on a surface of said heat-shrinkable resin sheet or of said base prior to or subsequent to irradiation.

13. A method of making a decorative laminated structure having a predetermined surface pattern of convexes and concaves, at least one of said concaves being perforated, said concaves corresponding to picture areas of said laminated structure of a heat-sensitive ink composition containing a heat-absorbing coloring agent; and comprising printing a predetermined pattern of heat-sensitive picture areas on a surface of a base sheet, said heat-sensitive picture areas being a heat-sensitive ink composition containing a heat-absorbing coloring agent; adhering the thus printed surface of the base sheet to a heat-shrinkable resin sheet to form an integral composite material; and irradiating the resultant composite material with an infrared or near infrared heat ray for a sufficient time such that heat energy is preferentially absorbed by said heat-sensitive ink composition causing said heat shrinkable resin sheet to shrink locally and form said concaves at areas corresponding to said heat-sensitive picture areas and causing at least one of said concaves to perforate.

14. The method of claim 13 wherein a pattern of heat-insensitive picture areas having a predetermined positional relationship with respect to said heat-sensitive picture areas is printed on a surface of said heat-shrinkable resin sheet or of said base prior to or subsequent to irradiation.

15. A method of making a decorative laminated structure having a predetermined surface pattern of convexes and concaves, at least one of said concaves being perforated, said concaves corresponding to picture areas of said laminated structure of a heat-sensitive ink composition containing a heat-absorbing coloring agent; and comprising adhering a heat-shrinkable resin sheet to a base sheet to form an integral composite material; printing a predetermined pattern of heat-sensitive picture areas on the heat-shrinkable resin sheet surface of said integral composite material, said heat-sensitive picture areas being a heat-sensitive ink composition containing a heat-absorbing coloring agent; and irradiating the thus printed integral composite material with an infrared or near infrared heat ray for a sufcicient time such that heat energy is preferentially absorbed by said heat-sensitive ink composition causing said heat shrinkable resin sheet to shrink locally and form said concaves at areas corresponding to said heat-sensitive picture areas and causing at least one of said concaves to perforate.

16. The method of claim 15 wherein a pattern of heat-insensitive picture areas having a predetermined positional relationship with respect to said heat-sensitive picture areas is printed on a surface of said heat-shrinkable resin sheet or of said base prior to or subsequent to irradiation.

17. The method of claim 15 wherein a continuous layer of a heat-insensitive ink composition is printed on a surface of said base sheet prior to adhering the base sheet to said heat-shrinkable resin sheet.

18. The method of claim 9 wherein said integral composite material is coated with an overcoat layer prior to or subsequent to irradiation.

19. The method of claim 13 wherein said integral composite material is coated with an overcoat layer prior to or subsequent to irradiation.

20. The method of claim 15 wherein the printed integral composite material is coated with an overcoat layer prior to or subsequent to iradiation.

21. The method of claim 9 wherein said heat-shrinkable resin sheet is a thermoplastic resin sheet stretched in a predetermined direction.

22. The method of claim 13 wherein said heat-shrinkable resin sheet is a thermoplastic resin sheet stretched in a predetermined direction.

23. The method of claim 15 wherein said heat-shrinkable resin sheet is a thermoplastic resin sheet stretched in a predetermined direction.

24. The method of claim 21 wherein the thermoplastic resin sheet is a sheet of a member selected from the group consisting of polyvinyl chloride resins, polyvinylidene chloride resins, polyolefin resins, polystryene resins, polyester resins, polyamide resins, polycarbonate resins, polyvinyl resins, cellulose resins and rubber resins.

25. The method of claim 22 wherein the thermoplastic resin sheet is a sheet of member selected from the group consisting of polyvinyl chloride resins, polyvinylidene chloride resins, polyolefin resins, polystyrene resins, polyester resins, polyamide resins, polycarbonate resins, polyvinyl resins, cellulose resins and rubber resins.

26. The method of claim 23 wherein the thermoplastic resin sheet is a sheet of a member selected from the group consisting of polyvinyl chloride resins, polyvinylidene chloride resins, polyolefin resins, polystyrene resins, polyester resins, polyamide resins, polycarbonate resins, polyvinyl resins, cellulose resins and rubber resins.

27. The method of claim 9 wherein the base sheet is a material capable of adhering to the heat-shrinkable resin sheet through the medium of an adhesive.

28. The method of claim 13 wherein the base sheet is a material capable of adhering to the heat-shrinkable resin sheet through the medium of an adhesive.

29. The method of claim 15 wherein the base sheet is a material capable of adhering to the heat-shrinkable resin sheet through the medium of an adhesive.

30. The method of claim 9 comprising the further step of heat-treating the laminated structure at an elevated temperature while fixing the peripheral ends of the structure to effect heat fixation in the heat-shrinkable resin sheet to reduce the heat shrinkability thereof.

31. The method of claim 13 comprising the further step of heat-treating the laminated structure at an elevated temperature while fixing the peripheral ends of the structure to effect heat fixation in the heat-shrinkable resin sheet to reduce the heat shrinkability thereof.

32. The method of claim 15 comprising the further step of heat-treating the laminated structure at an elevated temperature while fixing the peripheral ends of the structure to effect heat fixation in the heat-shrinkable resin sheet to reduce the heat shrinkability thereof.

33. The method of claim 30 wherein said heat treatment is carried out at a temperature higher than the shrinkage-initiating temperature and the second transition point of the heat-shrinkable resin sheet but lower than the melting point thereof.

34. The method of claim 31 wherein said heat treatment is carried out at a temperature higher than the shrinkage-initiating temperature and the second transition point of the heat-shrinkable resin sheet but lower than the melting point thereof.

35. The method of claim 32 wherein said heat treatment is carried out at a temperature higher than the shrinkage-initiating temperature and the second transition point of the heat-shrinkable resin sheet but lower than the melting point thereof.

36. The method of claim 30 wherein said heat treatment is carried out at a temperature higher than the temperature at which the heat-shrinkable resin sheet was stretched at the time of preparation thereof.

37. The method of claim 31 wherein said heat treatment is carried out at a temperature higher than the temperature at which the heat-shrinkable resin sheet was stretched at the time of preparation thereof.

38. The method of claim 32 wherein said heat treatment is carried out at a temperature higher than the temperature at which the heat-shrinkable resin sheet was stretched at the time of preparation thereof.

* * * * *